Fig I

Aug. 27, 1929. P. V. McCASH 1,725,928
AUTOMATIC ELECTRIC CURRENT CONTROLLING MEANS
Original Filed Nov. 2, 1922 3 Sheets-Sheet 2

INVENTOR.
PERRY V. McCASH.
BY *Merrill M. Blackburn*
ATTORNEY.

Patented Aug. 27, 1929.

1,725,928

UNITED STATES PATENT OFFICE.

PERRY V. McCASH, OF SEATTLE, WASHINGTON, ASSIGNOR TO ROY I. FREDERICK, OF KINGS COUNTY, WASHINGTON.

AUTOMATIC ELECTRIC-CURRENT-CONTROLLING MEANS.

Continuation of application Serial No. 598,629, filed November 2, 1922. This application filed December 21, 1925. Serial No. 76,754.

This invention relates generically to means for intermittently turning on and turning off electric lights, such as are used in electric signs, street signals and at railroad crossings. Stated broadly, the invention comprises a plurality of load circuit switches, a control circuit switch, a plurality of electromagnets for controlling the opening and closing of the switches, and retarding means for retarding and delaying the action of the control circuit switch.

Among the objects of this invention are to provide an improved mode of controlling the flow of current to a plurality of load circuits; to provide an improved structure for controlling the intermittent flow of electric current; to provide a structure in which the controlling electromagnets pull controlling armatures, substantially simultaneously, toward opposite ends thereof to control the functioning of the circuit; to provide a mechanism which will operate substantially uniformly, notwithstanding variations in the current strength of city lighting systems at different times of the day; and such further objects, advantages and capabilities as will hereafter more fully appear and as are inherent in the construction disclosed.

My invention further resides in the combination, construction and arrangement of parts illustrated in the accompanying drawings and, while I have shown therein one embodiment of my invention, I desire the same to be understood as illustrative only and not as limiting said invention.

Figure 1:
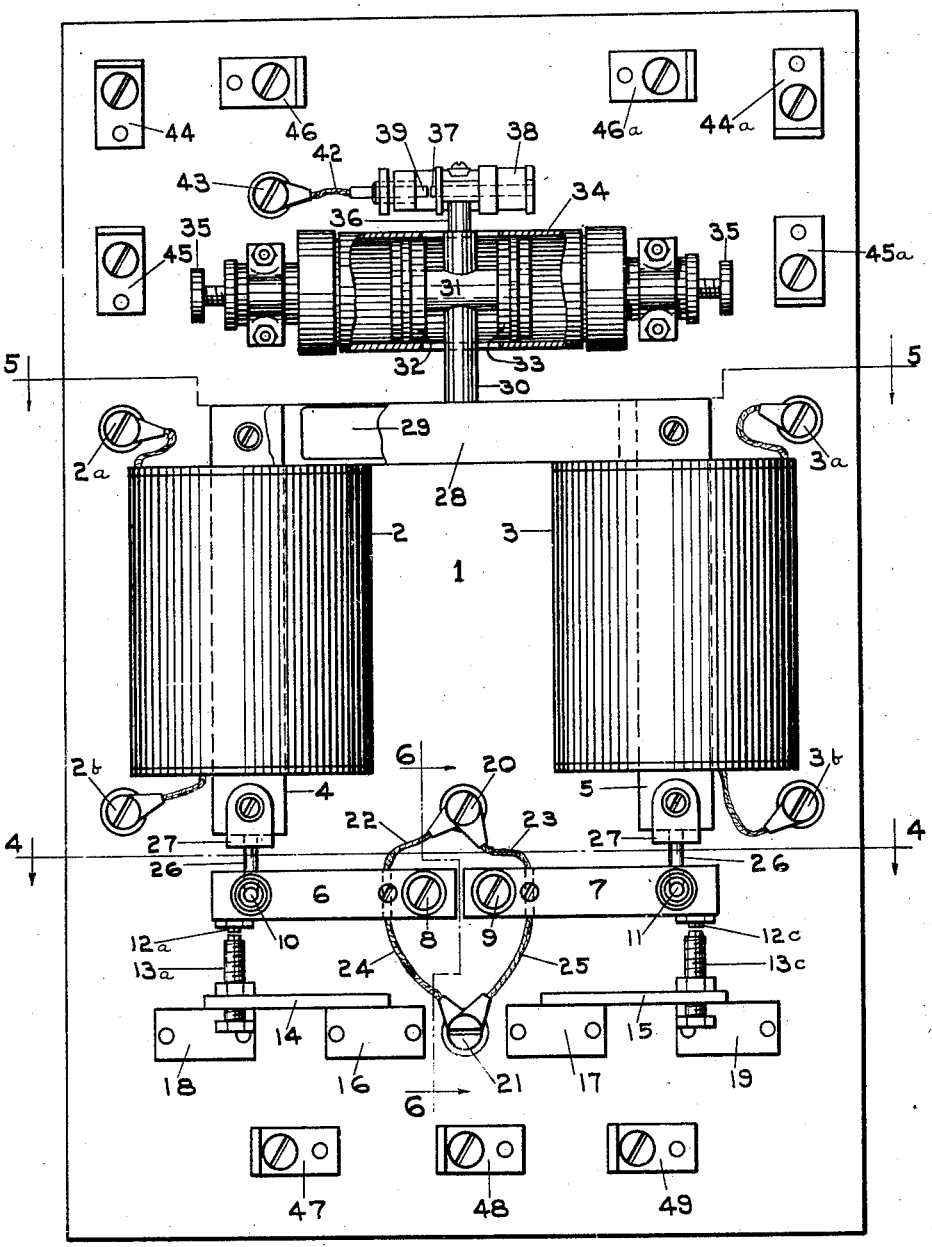
Figure 2:
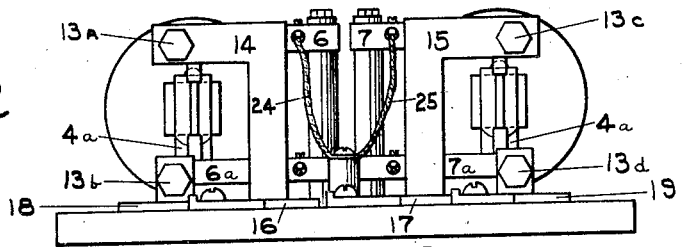
Figure 3:
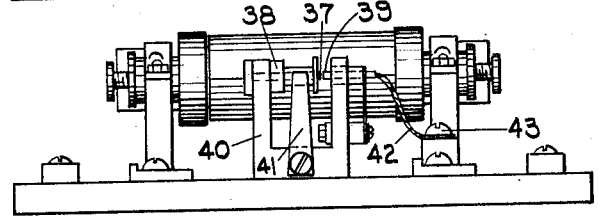
Figure 4:
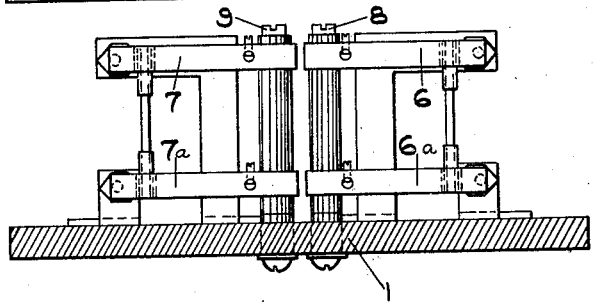
Figure 5:
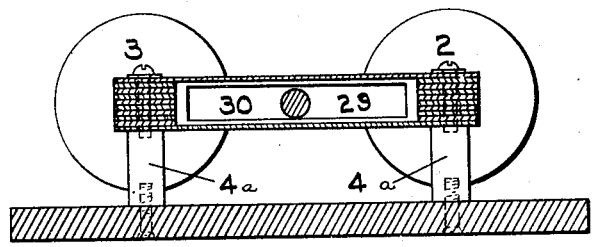
Figure 6:
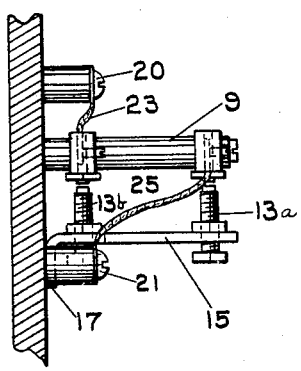
Figure 7:
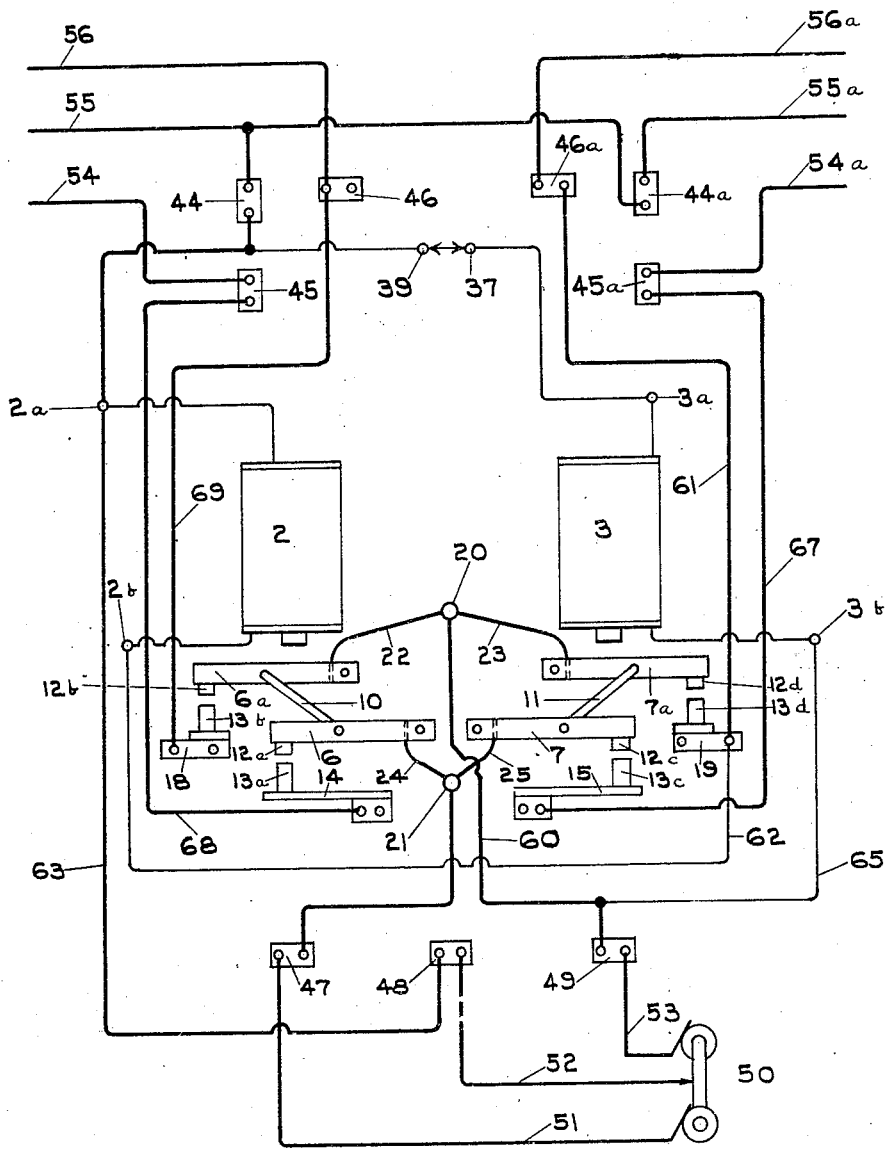

In the drawings attached hereto and forming a part hereof, Fig. 1 is an elevation of a controlling switch in accordance with my invention; Fig. 2 is an inverted plan view of the structure shown in Fig. 1; Fig. 3 is a plan view thereof; Fig. 4 is a section substantially along the plane indicated by the line 4—4 Fig. 1; Fig. 5 is a section substantially along the plane indicated by the line 5—5 Fig. 1; Fig. 6 is a vertical section substantially along the plane indicated by the line 6—6 of Fig. 1; Fig. 7 is a diagrammatic view showing the wiring diagram of this new controlling switch.

Referring more in detail to the annexed drawing, numeral 1 designates the base or panel upon which the parts of my construction are mounted, while numerals 2 and 3 denote a pair of electromagnets carried by the panel and having their terminals connected respectively to the terminals $2^a$, $2^b$, $3^a$ and $3^b$. These electromagnets are provided with cores 4 and 5, said cores being preferably of laminated magnetic material. As shown in Figs. 2 and 5 the ends of the electromagnets are supported upon the panel by means of posts $4^a$.

As shown in Fig. 4, a plurality of switch levers 6, 7, $6^a$ and $7^a$ are pivoted upon insulating posts 8 and 9 or are insulated from these posts if they are not made of insulating material. These levers 6, $6^a$ and 7, $7^a$ are connected in pairs by the cross-bars 10 and 11 and each carries adjacent its extermity a contact 12, intermittently engageable with cooperating contacts 13, these contacts being designated specifically by the numerals $12^a$, $12^b$, $12^c$, $12^d$, $13^a$, $13^b$, $13^c$ and $13^d$. The arrangement of the supports for these contacts 13 is not clear from Fig. 1 but it will be seen by referring to Fig. 2 that the two forward contacts 13 are carried by L-shaped conducting bars 14 and 15 which are integral with or secured to members 16 and 17 whereby they are mounted upon the panel 1. Also, the rearward contacts 13 are mounted in horizontal extensions from the mounting pieces 18 and 19, shown most clearly in Fig. 1. A pair of connecting posts 20 and 21 are mounted upon the panel 1 and have flexible conductors 22, 23, 24 and 25 leading therefrom to the levers $6^a$, $7^a$, 6 and 7, respectively. From this and an inspection of Fig. 7 it will be apparent that the conductors 22 and 23 go to the rearward pair of contact levers, while the conductors 24 and 25 go to the forward levers. From the cross-bars 10 and 11, which are insulated from the contact levers, there extend upwardly paramagnetic means 26 serving as armatures for the cores of the electromagnets. These means 26 pass through openings in the angular diamagnetic members 27 and are capable of reciprocating therein toward and away from the cores of the coils.

Connecting the upper ends of the cores 4 and 5 is a shell 28 in which is located a paramagnetic member 29 capable of sliding toward one or the other of the cores 4 and 5, depending upon which one of the coils 2 and 3 is energized. Extending upwardly from this bar 29 is a post 30 which reciprocates with the bar 29 and extends through a slot in the upper face of the shell. This post passes through or is otherwise secured to a connecting link 31 carrying adjacent its two ends pistons 32 and 33. These pistons slide in a cylinder 34 from the ends of which air is permitted to escape through vents controlled by adjustable means 35 whereby the rate of escape of air may be regulated. The upper end 36 of the post 30 projects beyond the cylinder 34 and has secured thereto a slidable contact member 37 which reciprocates in its supporting means 38, moving into and out of contact with the adjustable contact 39 as the bar 29 reciprocates in its shell. The supporting means 38 and the contact 39 are carried by a bracket 40 which also carries a spring contact member 41, which latter is in electrical contact with the contact member 37. A lead 42 extends from the contact member 39 to the connecting post 43 which is connected electrically with the connector 44 for the neutral load wire of a 3 wire system. The functions of the connectors 45, 46, 44$^a$, 45$^a$, 46$^a$, 47, 48 and 49 will be presently described.

Referring now to Fig. 7, numeral 50 designates a source of current from which lead the conductors 51, 52 and 53. These conductors are connected respectively to the connectors 47, 48 and 49 for furnishing the current to be controlled, said current passing through my new control switch described above. After passing through this control switch, the current is distributed to the load wires 54, 55, 56, 54$^a$, 55$^a$ and 56$^a$ as will be readily understood, these load conductors being connected respectively to the connectors 45, 44, 46, 45$^a$, 44$^a$ and 46$^a$.

Assuming the switch contacts 37 and 39 to be in engagement and that all of the switches 6, 7, 6$^a$, 7$^a$ are closed, when the current is turned on, it will take the following course:

From source 50 through wires 51, 52 and 53 to the connectors 47, 48 and 49. Since the current flowing through switches 6, 6$^a$, and 7 does not enter into the control of the circuit but is merely fed through those switches to the contacts to which the load circuit is connected, the circuit through these three switches will, for the present, be disregarded. The current flowing through connector 49 passes through conductor 60 to post 20 and from thence through conductor 23, switch lever 7$^a$, contacts 12$^d$, 13$^d$ and bracket 19, where it divides, part flowing through conductor 61 to connector 46$^a$, from which it is fed to the load circuit, and part passing through control conductor 62 to connector 2$^b$, coil 2, connector 2$^a$ and back through conductor 63, connector 48 and conductor 52 to the source 50. While, under the circumstances indicated, the circuit is now closed through connector 44 and load conductors 54, 55 and 56 as well as through contacts 37 and 39, and both coils 2 and 3, the circuit will not remain closed as indicated, when the current is turned on for the following reason:

Since the current which flows through switch 7$^a$, conductor 62 and coil 2 is under control of electromagnet 3, the flow of this current through the indicated switch and the coil 2 will cease immediately upon the circuit being closed, because current flows from connector 49 through conductor 65, connector 3$^b$, coil 3, connector 3$^a$, switch contacts 37, 39 and return conductor 63. The flow of current through this circuit is not immediately interrupted, since the same is not under the influence of an immediately responsive electromagnetic switch. The current will therefore continue to flow through electromagnet 3 until the attraction thereof for the bar 29 has caused this and the piston carried thereby to move to the right far enough to cause separation of the contacts 37 and 39. As soon as these contacts are separated, current ceases to flow through coil 3 and contact levers 7 and 7$^a$ drop so that the circuits through contacts 12$^c$, 13$^c$, 12$^d$ and 13$^d$ are closed and current flows to connectors 45$^a$, and 46$^a$ and from there to the load circuit. Also, current now flows through switch 12$^d$, 13$^d$, conductor 62 and coil 2. This results in the switch levers 6 and 6$^a$ being pulled toward the electromagnet 2 and the circuits to connectors 45 and 46 being broken. Current will now flow through the circuits as follows:—

From 49 through 60, 20, 23, 7$^a$, 12$^d$, 13$^d$, 19, 61, 46$^a$, load, 44$^a$, 44, 63 and 52. Current also flows from 19 through 62, 2$^b$, 2 and 2$^a$, returning through 63 and 52 as above. Current also flows through 51, 47, 21, 25, 7, 12$^d$, 13$^d$, 15, 67, 45$^a$, load, 44$^a$, 44, 63 and 52. As soon as the current starts to flow through coil 2, it causes the pulling of armature 26, attached to switch levers 6 and 6$^a$ toward the electromagnet and also the pulling of bar 29 toward the core 4. The piston in cylinder 34 will retard the action of this bar and the closing of the switch contacts 37 and 39, but as soon as these contacts are closed, coil 3 is again energized with the result that the circuit through 12$^d$ and 13$^d$ is again broken and coil 2 de-energized. This causes the bar 29 to move to the right again as indicated above, thus resulting in a repetition of the action outlined above. The speed at which these changes are made can be varied by proper adjustment of the adjusting means 35, as set forth above. It is thought that further explanation of how the current flows through the electromagnetic switches and the conductors 61, 67, 68 and 69 to the terminals 45, 46, 45$^a$ and 46$^a$ will now be unnecessary.

The present case is filed as a continuation of and substitution for my prior application Serial No. 598,629.

It is believed it will now be apparent from the present disclosure that the structure herein set forth is adapted to accomplish the various objects recited.

Having now disclosed my invention, I claim:

1. In a circuit controller, a pair of electromagnets, a paramagnetic bar adjacent one end of each of said electromagnets and capable of moving longitudinally toward whichever one of the magnets is energized by a current flowing therethrough, switches opposite the other ends of the magnets, paramagnetic movable means adjacent said last named ends of the electro-magnets and connected to the switches whereby the latter may be actuated when the magnets have a current flowing therethrough, and a switch connected to said bar to be actuated thereby to open and closed positions simultaneously with the other switches.

2. In a circuit controller, a pair of electromagnets, switches arranged at opposite ends thereof, movable means adjacent both ends of both electromagnets and capable of moving toward them under the influence thereof, said means being connected to the switches so that they are moved concurrently by their respective moving means, one of said moving means and its associated switch moving longitudinally, transversely of the axes of the electromagnets.

3. In a circuit controller, a pair of electromagnets, a slidable magnetic bar adjacent one end of each of said electromagnets, said bar being capable of sliding in a plane transverse to the axes of said eletromagnets under the influence thereof and a switch carried by said bar.

4. In a circuit controller, a pair of electromagnets, a paramagnetic bar adjacent one end of each of said electromagnets and capable of moving toward whichever one of the magnets is energized by a current flowing therethrough and simultaneously moving away from the other one, switches opposite the other ends of the magnets, paramagnetic movable means adjacent said last named ends of the electromagnets and connected to the switches whereby the latter may be actuated when the magnets have a current flowing therethrough, a switch connected to said bar for movement therewith, said switch serving to control the supply of current to one of the electromagnets.

5. In a device of the character indicated, a pair of electromagnets having cores, movable paramagnetic means at each end of both magnets, said means at the ends of each magnet being mounted to move toward the cores of said magnets according to which one is energized, switches connected to the paramagnetic means, a switch at one end of the electro-magnets controlling the supply of current to one of the electromagnets, and a switch at the opposite end of the electromagnets controlling the supply of current to the other electromagnet and retarding means connected to one of the switches to retard its opening and closing.

6. A sign flashing device for alternately energizing the circuits of signs, said device including a pair of electromagnets, circuiting contacts mounted for pivotal movement below each magnet and adapted to control said circuits in accordance with the condition of the magnets, a sliding armature common to both magnets, a contact connected to and controlled by said sliding armature, said contact controlling the energization of the electromagnets, and means intermediate the contact and sliding armature to vary the time period of movement of the sliding armature at will.

7. A sign flashing device for alternately energizing the circuits of signs, said device including a pair of electromagnets, circuiting contacts mounted for pivotal movement below each magnet and adapted to control said circuits in accordance with the condition of the magnets, a sliding armature common to both magnets, a rod carried by said armature, a magnet-circuit controlling contact carried by the rod, and a dash pot controlling the movement of the rod.

8. A sign flashing device for alternately energizing the circuits of signs, said device including a pair of electromagnets, circuiting contacts mounted for pivotal movement below each magnet and adapted to control said circuits in accordance with the condition of the magnets, a sliding armature common to both magnets, a rod carried by said armature, a magnet-circuit controlling contact carried by the rod, and a dash pot controlling the movement of the rod in both directions, the circuit in which said controlling contact is located including as an element one of the electromagnets.

In witness whereof, I hereunto subscribe my name to this specification.

PERRY V. McCASH.